UNITED STATES PATENT OFFICE.

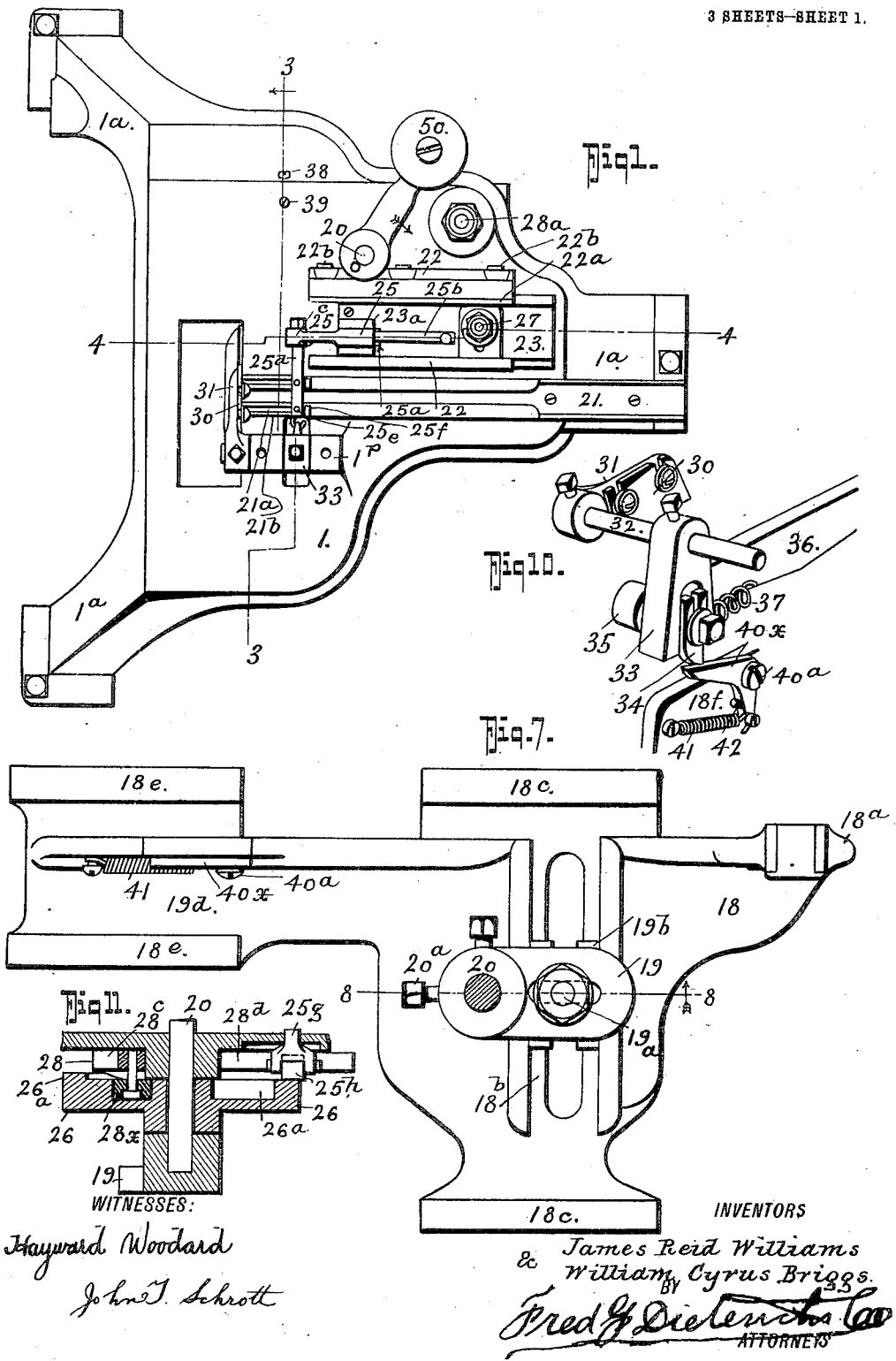

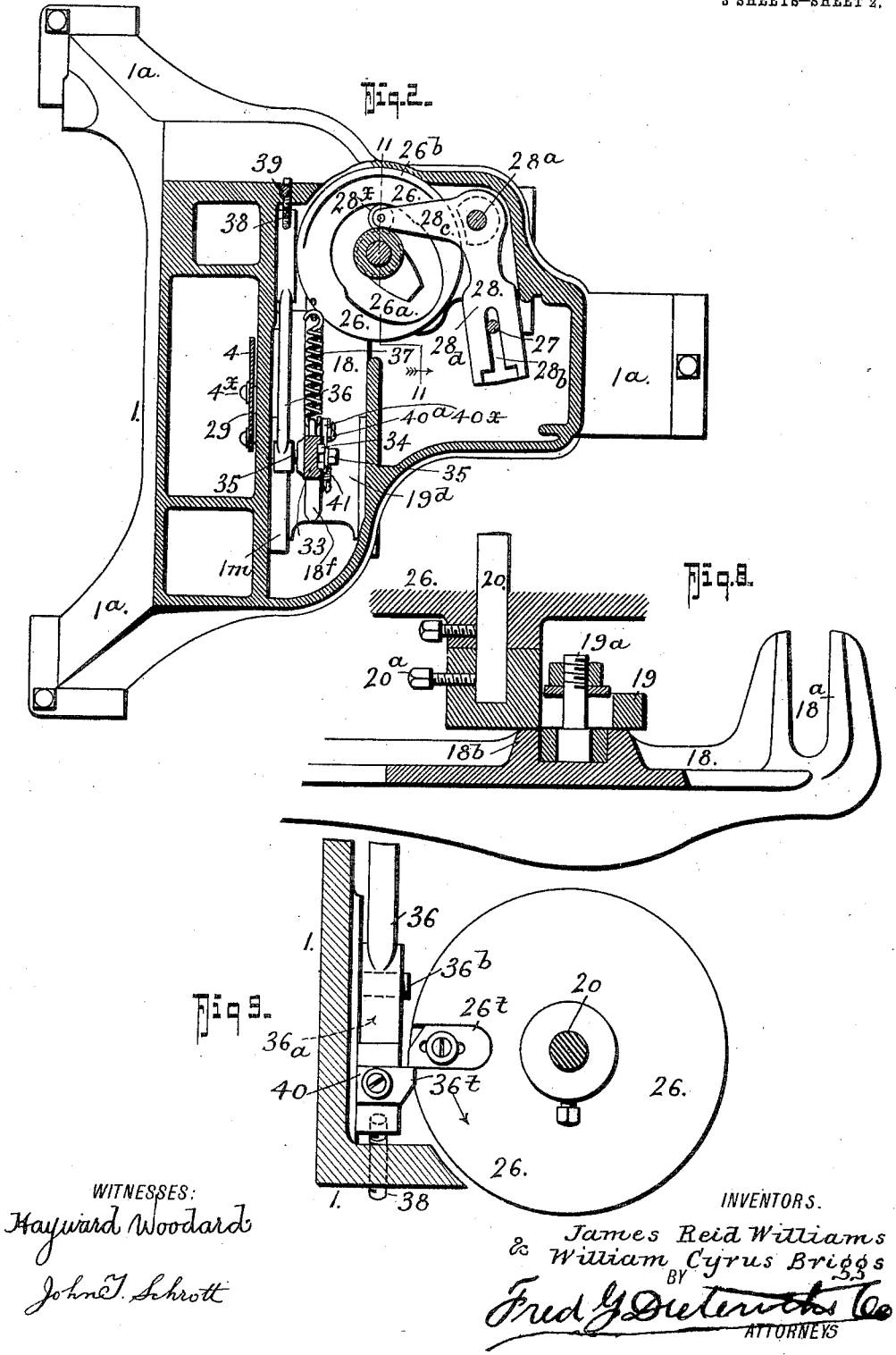

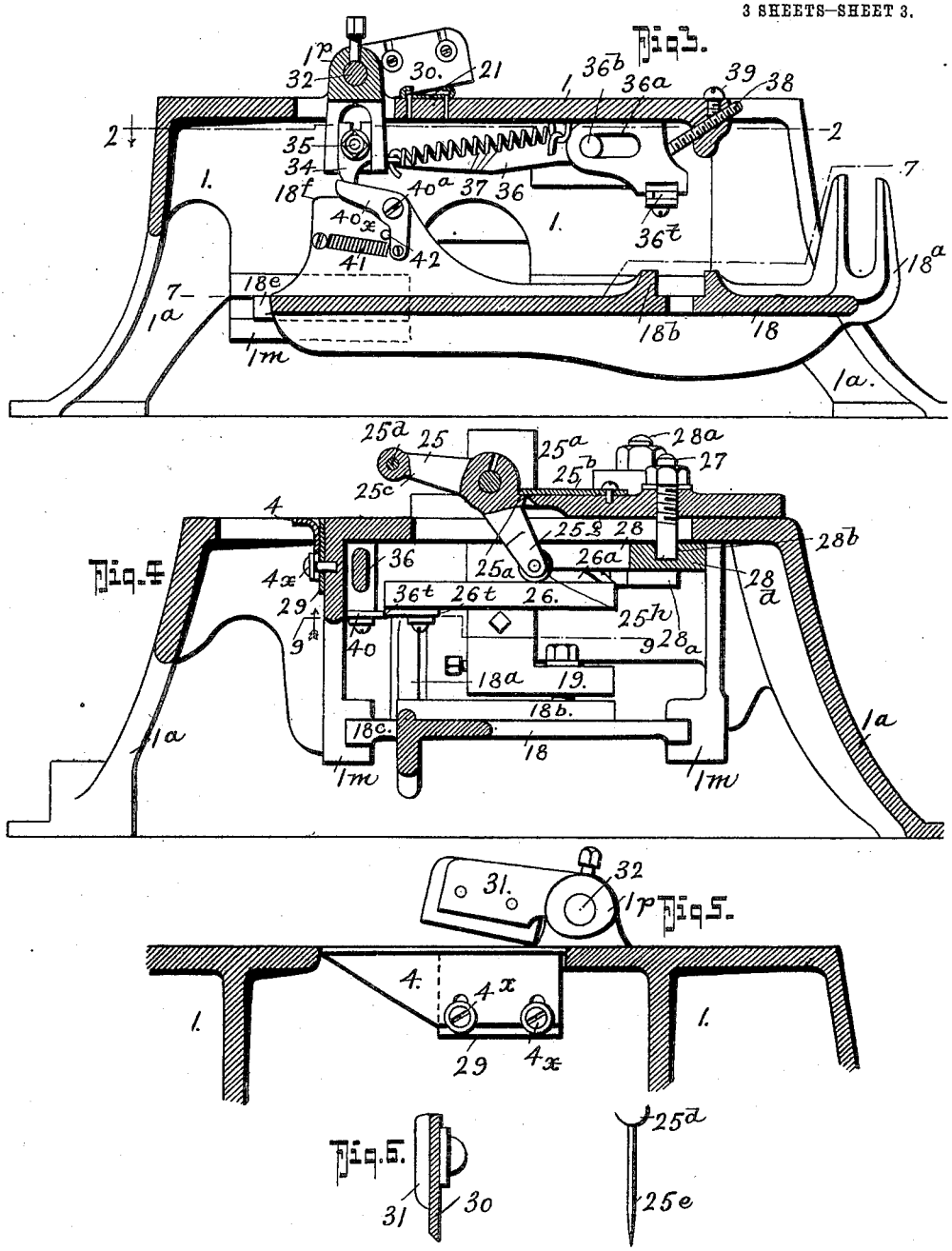

JAMES R. WILLIAMS, OF NEW YORK, N. Y., AND WILLIAM C. BRIGGS, OF WINSTON SALEM, NORTH CAROLINA, ASSIGNORS TO THE NATIONAL STAMP VENDING MACHINE COMPANY, INCORPORATED, OF WILMINGTON, NORTH CAROLINA.

CUTTING MECHANISM FOR ENVELOP-LOADING MACHINES, &c.

971,713.     Specification of Letters Patent.     Patented Oct. 4, 1910.

Original application filed August 20, 1908, Serial No. 449,486. Divided and this application filed July 24, 1909. Serial No. 509,452.

*To all whom it may concern:*

Be it known that we, JAMES REID WILLIAMS, at present residing at New York, in the county of New York and State of New York, formerly of Wilmington, North Carolina, and WILLIAM CYRUS BRIGGS, residing at Winston Salem, in the county of Forsyth and State of North Carolina, have invented certain new and useful Improvements in Cutting Mechanism for Envelop-Loading Machines and the Like, of which the following is a specification.

Our invention, which relates to a cutting mechanism for use in machines for automatically loading vendible articles in continuous envelops of the type disclosed in Patent No. 895,527, granted August 11, 1908, comprises a special type of cutting mechanism for severing the vendible article from a strip prior to its insertion into the continuous envelop, and the present application is a divisional part of our copending original application filed August 20, 1908, Serial No. 449,486.

Referring now to the accompanying drawings,—Figure 1, is a top plan view of our machine. Fig. 2, is a horizontal section on the line 2—2 of Fig. 3. Fig. 3, is a vertical section on the line 3—3 of Fig. 1. Fig. 4, is a vertical cross section on the line 4—4 of Fig. 1. Fig. 5, is a detail section of a part of the machine. Fig. 6, is a further detail section taken in a plane at right angles to that of Fig. 5. Fig. 7, is a detail horizontal section on the line 7—7 of Fig. 3, the bearing portions and the supporting frame being omitted. Fig. 8, is a section on the line 8—8 of Fig. 7. Fig. 9, is a detail section on the line 9—9 of Fig. 4, looking in the direction of the arrow. Fig. 10, is a detail perspective view of a part of the cutting mechanism. Fig. 11, is a section on the line 11—11 of Fig. 2.

Referring now to the accompanying drawings in which like letters and numerals of reference indicate like parts in all of the figures 1 is the supporting bed of the machine which is supported on legs $1^a$, as shown.

*Article-feeding mechanism.*—The vendible article feeding mechanism comprises a chute 21 in which the vendible article strip is inserted, the chute 21 being secured to the main frame 1 to lie in a plane parallel with the top of the frame 1. At its delivery end the chute 21 is slotted as at $21^a$ to provide resilient fingers $21^b$ that press down upon the vendible article. The slots $21^a$ also serve as passage-ways for the feeding needles $25^e$, hereinafter again referred to. Mounted to slide in bearings 22 on the frame 1 is a carriage 23. One or both of the bearings 22 may be provided with a wear piece $22^a$ which, as the bearing surfaces wear, may be tightened up by set screws $22^b$, as shown in Fig. 1, of the drawings. The carriage 23 has bearing lugs $23^a$ in which a rocking member 25 is pivoted, the rocking member 25 having an arm $25^c$ that carries a rod $25^d$ that projects over the chute 21 and is apertured to receive the gripping needles $25^e$, the needles $25^e$ being held in position by set screws $25^f$. The rocking member 25 is also provided with a heel $25^a$ against which a leaf spring $25^b$ presses to normally hold the arm $25^c$ elevated with the needles $25^e$ out of engagement with the article strip. The rocking member 25 is also provided with an operating lever portion $25^g$ that carries a friction roller $25^h$ that engages the cam disk 26 whose peripheral cam surface $26^b$ is adapted to rock the rocking member 25 to bring its needles $25^e$ into and out of engagement with the vendible article strip.

The cam disk 26 is provided with a cam groove $26^a$ to form a camway in which an anti-friction roller $28^x$ that is carried by one arm $28^c$ of a bell crank lever 28, operates. The bell crank lever 28 is pivoted at $28^a$. The other arm $28^d$ of the bell crank lever 28 is slotted as at $28^b$ to receive the pin 27 that projects from the carriage 23 and through the medium of which the carriage 23 is operated. The foregoing constitute the article feeding mechanism.

*Strip cutting mechanism.*—The strip cutting mechanism comprises a fixed knife 29 that is secured by the screws $4^x$ between the opener 4 and the frame or casting 1. The fixed knife 29 coöperates with a movable knife 30 that is secured to the arm 31 that is in turn fastened to a shaft 32 which is mounted in bearings $1^p$ of the frame 1, the rock shaft 32 having an arm 33 secured thereto to project through an aperture in the casting 1. The arm 33 carries an adjustable trip 34, most clearly shown in Fig. 4, of the drawings, and is pivoted at 35 to a reciprocating rod 36 having an elongated aperture 36ª through which a screw 36ᵇ passes into the frame 1 to limit the reciprocatory movement of the rod 36, the rod 36 being moved in one direction, under the influence of a coil spring 37 to hold the movable knife 31 out of engagement with the fixed knife 29, as clearly shown in Fig. 4, of the drawings.

38 designates an adjusting screw which is locked by a set screw 39 and through the medium of which the throw of the movable knife 31 may be adjusted by limiting the movement of the rod or arm 36 in one direction. The arm 36 carries a trip 40 which is adapted to be engaged by an adjustable trip 26ᵗ carried by the under surface of the cam disk 26 so as to effect a positive return of the knife 30 to its "open" or elevated position.

The frame 18 has an extension 19ᵈ provided with slide bearings 18ᵉ to coöperate with the bracket bearings 1ᵐ of the frame 1 and the extension 19ᵈ has a web 18ᶠ to which a pawl 40ˣ is pivoted, as at 40ª, the pawl 40 being spring pressed in one direction by a spring 41 and its movement in such direction being limited by a stub pin 42 on the web 18ᶠ. Thus as the frame 18 is oscillated, the pawl 40ˣ will engage the trip 34 and cause the movable knife 30 to effect a shearing action in conjunction with the fixed knife 29 and cut off a section of the vendible article.

*Operation.*—Upon inserting a vendible strip, say, a strip of postage stamps, in the chute 21 and turning the crank 50, the following general action takes place, to wit:— The arm 25 is rocked to insert the needles 25ᵉ into the vendible article strip, after which the carriage 23 is moved from right to left in Fig. 1, a distance sufficient to project one article section (one stamp) beyond the cutting knife 30. As soon as the article section has been projected past the knife, the arm 25 is again rocked and the needles 25ᵉ withdrawn from the vendible strip. A further movement of the crank 50 in the direction of the arrow in Fig. 1, serves to return the carriage 23 to its initial position, and at the same time the pawl 40ˣ engages the strip 34 to rock the movable knife 30 to cut the strip section that has been projected past the knife 30, the action of the knives being instantaneous.

The operation of the strip feeding mechanism in detail is as follows:—As the drive shaft 20 is rotated in the direction of the arrow, the cam disk 26 is first brought with its cam member 26ª under the anti-friction roller 25ʰ to cause the needles 25ᵉ to be inserted into the vendible strip and they will be held in their inserted position as long as the cam portion 26ª is under the roller 25ʰ. As soon as the needles have been inserted in the strip the cam groove 26ª will have moved the bell crank lever 28 to cause the carriage 23 to move forwardly toward the cutting knives and convey a section of the vendible strip past the cutting knives. As soon as the section of the vending strip has been moved the required distance past the cutting knives and the carriage 23 has reached the limit of its forward movement the cam member 26ª will leave the roller 25ʰ and the leaf spring 25ᵇ will rock the member 25 to withdraw the needles from the vendible strip so that upon further movement of the disk 26 the bell crank lever 28 will return the carriage 23 to its initial position. The rotation of the shaft 20, as before stated, causes the oscillation of the frame 18 back and forth in its bearings, the movement of such frame being so timed that as soon as the carriage 23 has returned to its initial position the pawl 40 will have engaged the trip 34 and moved the knife 31 to shear or cut off the inserted article section, after which the spring 37 will return the knife to its initial position. Should the knife stick, the trip 26ᵗ will engage the trip 36ᵗ and return the rod 36 to its initial position, and hence return the knife 31 to its initial position, after which all of the foregoing operations will be repeated.

From the foregoing description taken in connection with the accompanying drawings, it is thought the complete construction, operation and advantages of our invention will be readily understood by those skilled in the art to which the invention appertains.

What we claim is:

1. In a loader, an article feeding and delivering mechanism comprising an article chute, means for engaging the article in the chute and feeding it therethrough, combined with means for severing the article into sections as it leaves the chute, said severing means comprising a fixed cutter and a movable cutter, a sliding frame, means for operating said movable cutter to cut the article when the sliding frame moves in one direction, and means for returning the movable cutter to its initial position by the movement of the sliding frame.

2. In a loader, an article feeding and delivering mechanism comprising an article chute, means for engaging the article in the chute and feeding it therethrough, combined with means for severing the article into sections as it leaves the chute, said severing means comprising a fixed cutter and a movable cutter, a sliding frame, means for operating said movable cutter to cut the article when the sliding frame moves in one direction, means for returning the movable cutter to its initial position by the movement of the sliding frame, and a separate means independent of the sliding frame for returning the movable cutter to its initial position.

3. In a loader, an article feeding and delivering mechanism, a rotatable operating shaft, a reciprocating carriage operatively connected to said shaft and to said feeding and delivering mechanism, a cutting mechanism including a pivoted cutter to sever the delivered article, means normally holding said pivoted cutter in its non-cutting position and trip devices carried by said reciprocating frame and said pivoted cutter to operatively connect said parts at times to cause said pivoted cutter to move through its cutting motion.

4. In a loader, an article feeding and delivering mechanism, a rotatable operating shaft, a reciprocating carriage operatively connected to said shaft and to said feeding and delivering mechanism, a cutting mechanism including a pivoted cutter to sever the delivered article, means normally holding said pivoted cutter in its non-cutting position and trip devices carried by said reciprocating frame and said pivoted cutter to operatively connect said parts at times to cause said pivoted cutter to move through its cutting motion, and means independent of said reciprocating frame for restoring said cutter to its initial position.

5. In a loader, an article feeding and delivering mechanism, a rotatable operating shaft, a reciprocating carriage operatively connected to said shaft and to said feeding and delivering mechanism, a cutting mechanism including a pivoted cutter to sever the delivered article, means normally holding said pivoted cutter in its non-cutting position and trip devices carried by said reciprocating frame and said pivoted cutter to operatively connect said parts at times to cause said pivoted cutter to move through its cutting motion, and means independent of said reciprocating frame for restoring said cutter to its initial position, said last named means comprising a rotatable member carried by said shaft, a rod connected with said cutter and a projection on said rod to be engaged by said rotatable member at times.

JAMES R. WILLIAMS.
WILLIAM C. BRIGGS.

Witnesses to signature of James Reid Williams:
A. GASSELM,
JAMES B. BURNS.

Witnesses to signature of William Cyrus Briggs:
W. F. SHAFFNER,
C. T. LIMBOCK.